July 13, 1965  J. R. JEROMSON, JR  3,194,355
HYDRAULIC SHOCK ABSORBER WITH INITIAL IMPACT DAMPING
Filed Oct. 2, 1963
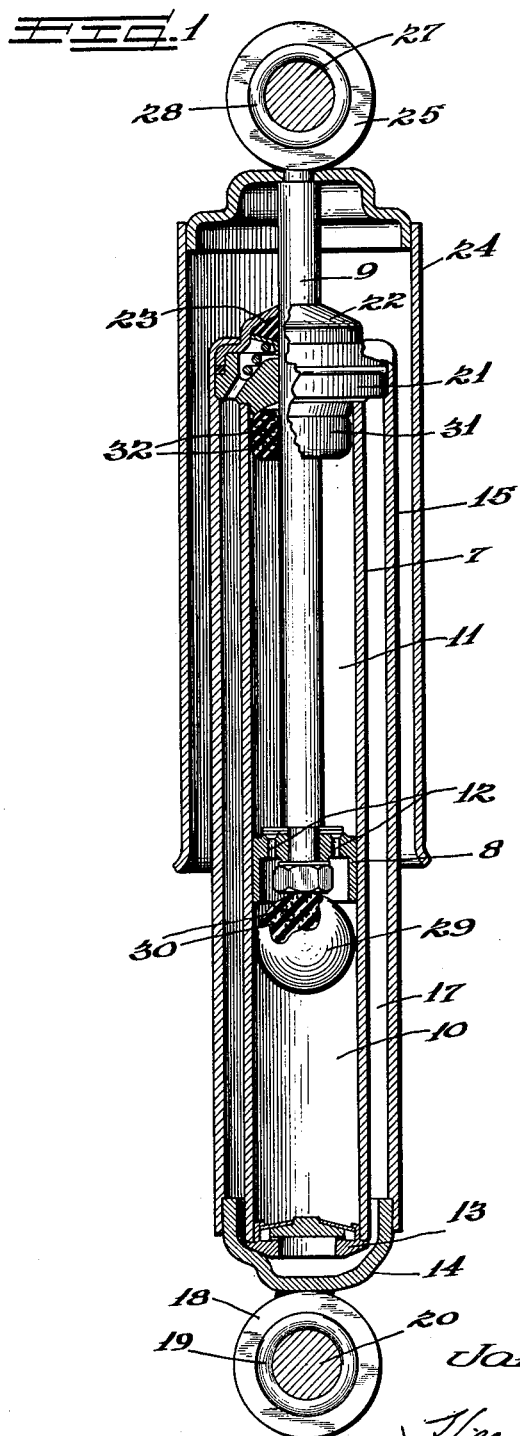
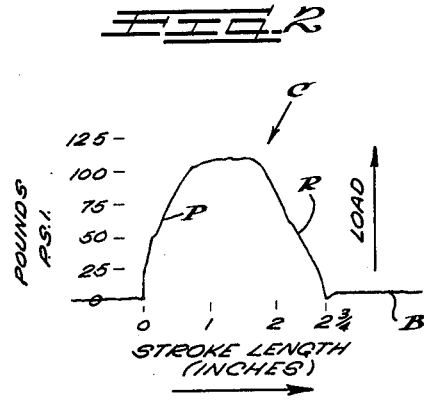
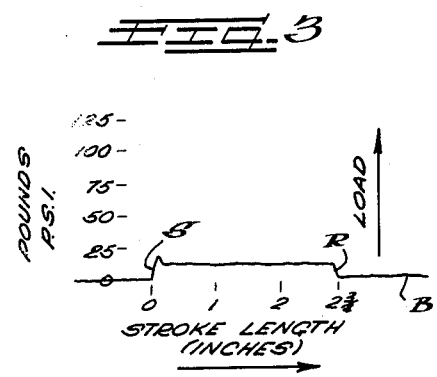
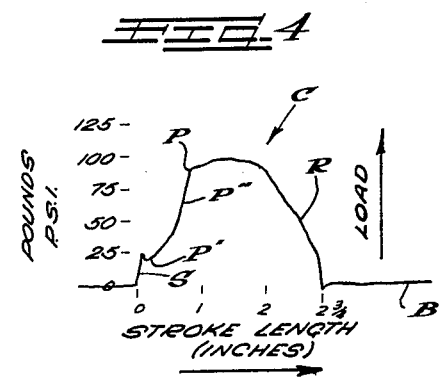
INVENTOR.
James R. Jeromson Jr.
BY
ATTORNEYS United States Patent Office 3,194,355
Patented July 13, 1965

3,194,355
HYDRAULIC SHOCK ABSORBER WITH INITIAL IMPACT DAMPING
James R. Jeromson, Jr., Willoughby Hills, Ohio, assignor to Thompson Ramo Wooldridge Inc., Cleveland, Ohio, a corporation of Ohio
Filed Oct. 2, 1963, Ser. No. 313,254
3 Claims. (Cl. 188—100)

This invention relates to hydraulic shock absorbers of the direct acting or telescopic type, and more particularly concerns such shock absorbers provided with means for preventing or at least significantly attenuating the sudden pressure pulses or shock waves which are often propagated as noise and/or as jolts through the shock absorbers and to the apparatus such as vehicle structures with which the shock absorbers are used.

One of the functions of the customary elastomeric bushings between the connecting eyes of direct acting shock absorbers in the knuckle connections with opposed relatively movable portions of a vehicle, for example, is to prevent transmission from the shock absorber of the relatively high frequency pulsations or shock waves resulting from the sudden pulses or thrusts of the piston relative to the cylinder of a magnitude or frequency greater than will permit, at least momentarily, displacement of the hydraulic fluid through the valve system of the shock absorber. Such bushings in order to perform most effectively for cushioning should be relatively soft. However, these bushings must also sustain and transmit the maximum damping force encountered during both compression (or jounce) and rebound strokes of the shock absorber. For this latter purpose, therefore, and to perform without undue extrusion of the rubber in the bushings, they must be made of a harder durometer stock. The bushings are therefore actually only relatively inefficiently absorptive of the shock waves.

Moreover, the shock waves also produce noise which is commonly referred to in the automotive trade as "chuckle." Such noise is, of course, the audible manifestation of vibrations in the metallic parts of the shock absorber and which are commonly transmitted to the associated vehicle and felt by the passengers as a jarring, uncomfortable shock.

The desirability of eliminating the disadvantages and undesirable results of sudden pressure pulses or waves has been recognized but no really efficient means have heretofore been provided for simply and economically curing the problem. For example, in Boehm et al. Patent 2,781,869, dated February 19, 1957, it is proposed to supply the compression and rebound chambers of a hydraulic shock absorber with rubber air sacks enclosing respective volumes of air which is compressible by collapsing of the rubber sacks to avoid the shocks incident to the relative incompressibility of the hydraulic fluid during the initial resistance to relative movement of the piston and cylinder responsive to high magnitude or frequency shocks. However, the disadvantage of such arrangement resides in the undue softness and relatively long travel permitted in the stroke of the shock absorber before orifice damping occurs at the very functional point highest shock absorbing or damping efficiency is most desirable. In other words, compression of the gas or air in the cushioning sacks results in a long relatively flat compression curve instead of the usual steeply ascending curve customarily attained by orifice flow damping.

It is accordingly an important object of the present invention to attain efficient elimination or at least significant attenuation of the sudden pressure pulse or wave reactions or shocks in the operation of a hydraulic shock absorber while maintaining the stroking characteristics of the shock absorber substantially close to the usual orifice flow damping rate.

Another object of the invention is to provide new and improved non-orifice supplementary shock and vibration damping in an essentially orifice or controlled passage flow shock absorber.

Still another object of the invention is to provide a hydraulic shock absorber with novel smoothly transitional spring rate cushioning.

Yet another object of the invention is to provide new and improved auxiliary damping means in the hydraulic shock absorber utilizing multi-closed cell elastomer means.

A still further object of the invention is to provide in a hydraulic shock absorber new and improved combined sudden pressure pulse or wave damping and stroke end buffer means.

Other objects, features and advantages of the present invention will be readily apparent from the following detailed description of a preferred embodiment thereof, taken in conjunction with the accompanying drawing, in which:

FIGURE 1 is a more or less schematic longitudinal sectional view through a direct acting hydraulic shock absorber embodying features of the invention;

FIGURE 2 is a representation of a compression stroke load curve in test stroking a standard type of direct acting hydraulic shock absorber;

FIGURE 3 is a stroking curve of the same shock absorber without any hydraulic fluid therein; and FIGURE 4 is a load curve showing the results during a test stroke under the same conditions as produced the curve of FIGURE 2, but modified with the mass of multi-closed cell elastomer in the compression chamber.

An important advantage of the present invention resides in that it is useful in suppressing shock waves and smoothing out the operation of any preferred construction of orifice flow direct acting or telescopic shock absorber, and more particularly the type of shock absorber which is now standard equipment in automobiles wherein there are generally four of such shock absorbers used as part of the undercarriage of each automobile. Shock absorbers of this type are also used in the undercarriage of airborne vehicles comprising airplanes, helicopters and the like.

For illustrative purposes, a more or less schematically illustrated shock absorber 5 is depicted in FIGURE 1 including as principal components an elongated tubular cylinder 7 having reciprocably operable therein a piston 8 attached to an upwardly extending concentric piston rod 9 of smaller diameter. Within the cylinder 7 below the piston rod 8 is defined a jounce or compression chamber 10 and above the piston 8 is defined a rebound chamber 11. These chambers are normally filled with suitable hydraulic fluid such as oil, and in the relative reciprocations of the cylinder 7 and the piston 8 this oil is metered through a suitable arrangement of orifices 12 generally, though not necessarily having associated control valving, by which frictional, damping, energy absorption is attained in the operation of the shock absorber.

Concentrically assembled with the lower end of the cylinder 7 is a foot valve structure 13 engaged concentrically with a lower closure cap member 14 to which is concentrically secured a reservoir tube or casing 15 of larger inside diameter than the outside diameter of the cylinder 7 to define a reservoir 17 into which oil displaced by the piston rod 9 during compression strokes is metered from the compression chamber 10 through the foot valve assembly 13 and from which the oil is returned through the foot valve assembly during rebound movement of the piston. Carried fixedly centrally on the lower side of the cap member 14 is a rigid connecting member, herein comprising an eye ring 18 of an inside diameter to receive a resilient bushing 19 engaged about means such as a bolt 20 or the like by which the lower end of the shock absorber is attached operatively to a suitable part of the undercarriage such as an axle housing or the like.

At their upper ends, the cylinder 7 and the reservoir casing tube 15 engage concentrically with a closure and bearing plug body 21 providing a bearing for the piston rod 9, and upon which is engaged an end cap 22 retaining packing 23 about the piston rod. Protectively enclosing the reservoir casing tube 15 and the upper end cap 22 as well as the upper end portion of the piston rod 9 is a dust and gravel guard shield tube 24 attached to the upper, outer extremity of the piston rod adjacent to means herein comprising an attachment eye ring 25 for securing the upper end of the piston rod operatively to the sprung carriage or chassis of the associated vehicle through the medium of means such as a bolt 27 and an interposed resilient bushing 28. If preferred, of course, the connecting eye 25, as also, or either the lower connecting eye 18 may be merely a stud, as is a well known equivalent in this art.

Normally the springs of the associated vehicle hold the body or chassis and the axle housings in spaced sprung relation, and the piston 8 therefore assumes the generally midway position in the cylinder 7 as shown. Any tendency toward excessive springing movements and more particularly generally vibratory movements between the sprung structures to which it is attached are suppressed by the shock absorber 5. However, since the hydraulic damping fluid or oil is relatively incompressible and the inherent resiliency of the metal parts of the shock absorber are virtually negligible, short amplitude, high shock loads or rapid short duration high impact loads, and particularly those involving high frequency vibratory, flutter conditions or approaching lower frequency audible sound, and more particularly during the compression stroke, are virtually undamped due to the inability of the metering orifices in the piston 8 and the foot valve 13 to pass the relatively incompressible viscous damping liquid therethrough at the velocities and volumes demanded by the sudden pressure pulses or shock waves generated by the high shock or impact loads. As a result in a conventional shock absorber, such shock waves are virtually undamped and the shock vibrations on impact are transmitted through the piston and piston rod and its connection with the body of the vehicle as a tactile reaction or perceptible jolt, often apparent as a sonic vibration in the damper system, commonly referred to in the automotive trade as "chuckle." Heretofore often highly complex types of series or parallel operable porting and valving and the like have been proposed to solve this problem, but have generally been of such complexity and oftentimes uncertain and limited performance as to be unwarranted from a cost-performance standpoint. Therefore, a low cost valve arrangement has generally been used, with compromise attempts at auxiliary damping by use of additional springs, various rubber bushing arrangements in the connections, and the like.

One prior attempt at overcoming the problem in a simple manner is disclosed in Patent No. 2,781,869 wherein rubber tubes filled with air are enclosed in free-floating relation within the compression and rebound chambers of the shock absorber to afford, as stated in that patent "free travel" of the piston. That is, pressure exerted through the liquid in the shock absorber during stroking of the piston causes compression of the air within the single air cells of the rubber tubes with collapsing of the tubes. However, the free travel permitted by this arrangement is objectionable because the very purpose of such a shock absorber is to reduce the amount of free travel which is normally permitted by the vehicle springs. In other words, a shock absorber should reduce the amplitude of the spring wave motion and flatten the curve rather than lengthen it. Thus, while the orifice damping afforded by the shock absorber reduces the springing amplitude, the collapsible air filled tubes permit some lengthening of the amplitude due to the free travel.

Further, the air cell tubes of the aforesaid patent will not sustain a blow at the extreme end of a stroke where the piston closely approaches the end closure member of the cylinder. The rubber tube walls will tend to be broken or rupture so that the relatively large volume of air in the cell will escape into the body of damping liquid.

According to the present invention, means are provided at least in the compression chamber, but desirably also in the rebound chamber of the shock absorber 5 taking advantage of the compressibility of a gas and the energy absorbing frictional characteristics of gas and elastomers to damp the shock waves generated or tending to be generated during high impact loads on the piston 8. For this purpose, a resiliently deformable, elastomeric damping mass 29, a substantial part of the volume of which comprises gas-filled, small, unconnected, discrete and independently acting, generally bubble-like cells 30, is disposed in preferably free floating relation in the compression chamber 10. In a desirable form, the damping mass 29 is of generally spherical or ball shape. Where the inside diameter of the cylinder 7 is about one inch, the diameter of the ball should be slightly smaller to permit free floating movement of the ball. For example, where the inside diameter of the cylinder is about .998 inch, the ball may be about .975 inch in diameter.

Any suitable, oil resistant elastomeric material may be used in the damping mass 29 capable of formation therein and sustentation of the multi-closed cell structure. For example, synthetic rubbers such as buna-N, polymerized chloroprene, and the like, adapted to be cured in a mold as by vulcanization or baking are suitable for the purpose. A composition of the selected rubber material including a plasticizer, a vulcanizing agent, a gas liberating agent capable of liberating substantial quantities of gas when heated and thereby swelling or expanding the elastomeric composition and producing a self-sustaining, resilient, elastic multi-closed cell rubber-like body is placed in a mold of the desired dimension and then cured, and after curing released from the mold. Although a single stage curing may be utilized, two stage curing is desirable where the assurance of virtual freedom from any open cell structure within the mass is desired. For most purposes, however, a single stage blowing cure will suffice since it is possible thereby to attain a damping mass that has a preponderance of gas-filled (nitrogen for example), unconnected, discrete generally bubble-like cells with a cell wall matrix connected throughout the body of the damping mass and affording a highly efficient internal friction damping structure.

Instead of vulcanization curing, some materials suitable or preferred and lending themselves to self-curing from a fluent state, e.g. certain polyurethane formulations, may be employed.

Silicone type rubbers are quite desirable because of their high temperature resistance, and also because of superior bubble forming and bubble holding properties, although higher cost factors must be considered.

Because of the high shock loads to be imparted to the damping mass, at least a preponderance of small size bubbles is desirable in the damping mass as for example from .001 to .03 inch diameter, depending upon the strength of the material and the percentage of confined gas in the bubbles 30. Generally, it is simplest to form the bubbles more or less uniformly throughout the mass except at a progressive transition or boundary region or skin that may be on the surface of the mass although such a skin is not essential and in some instances may be negligible or not materially greater than bubble wall thickness. Utter uniformity of bubble size is not essential since a percentage, such as 10 or 15% or more may be larger or smaller than a mean bubble size range, so long as the effective preponderance of the bubbles are in a preferred range of sizes.

Under compression, the multi-closed cell elastomeric mass 29 reduces in volume by bulk compression as distinguished from bulk deformation. That is, instead of flowing, the material compresses into itself. As such pressure-caused compression takes place, the bubbles nearest the area of impact are compressed and forced against the adjacent bubbles deeper within the mass which exert a resistance to the compressive force, and this reaction occurs progressively inwardly and results in a progressive reduction in transmitted pressures interiorly of the mass. This progressive reduction in transmitted pressures, as well as bursting forces in respect to the individual bubbles is greater for smaller diameter or smaller volume bubbles and increases rapidly as they become smaller down to practical limits. This phenomenon may also be described as a spring rate characteristic, comprising the rate at which resistance to deformation occurs. As a practical matter, the spring rate characteristics or stiffness of the material in the elastomeric damping body 29 should be such as to avoid any appreciable free travel of the piston 8 within the pressure range that may be accommodated by damping displacement of hydraulic fluid through the damping orifice system including the orifices 12, thus attaining all of the advantages inherent in the orifice damping function of the shock absorber. Coupled with this desirable attribute, advantage is taken of the unique ability of the multi-closed cell elastomeric damping body 29 to yield at an increasing spring rate under shock loads and more particularly shock load pressures transmitted thereto through the relatively incompressible hydraulic fluid in the compression chamber 10. As a result of the at least slight decrease in volume, the extent of which depends on the magnitude of the shock load, the rate of pressure rise in the hydraulic fluid remains below that value which would cause a shock wave to be generated. For this purpose, the generally spherical shape of the mass 29 affords substantial advantage in that although the bulk compressibility of the mass is of an order of stiffness which will require a shock load on the order of that which would in the absence of the damping body 29 cause a shock wave to develop in the hydraulic fluid in order to effect compression of the damping body by the hydraulic fluid, there is uniform inward pressure applied by the hydraulic fluid over the entire spherical surface of the damping mass. In effect, therefore, the damping mass is entirely confined within the pressure applying medium, namely, the hydraulic fluid with consequent attainment of a high spring rate by the applied shock force, all working toward the common center of the elastomeric damping mass 29. Unusual smoothness of operation of the shock absorber is therefore assured.

Test results have graphically demonstrated attainment of the new and improved results as outlined hereinbefore. Readings as recorded on a strip chart in a test fixture in which continuous measurement of the transmitted force in stroking of a standard, commercially available direct acting automobile shock absorber having the general characteristics of the shock absorber 5 are depicted in FIGURES 2–4.

For control, comparison purposes, the shock absorber employed in the test was first stroked in the fixture without any elastomeric damping means therein, namely, in the standard or conventional operating condition of the shock absorber. The test shock absorber had a cylinder bore diameter of about .998 inch. It was stroked in a 2¾ inch stroke at 107 cycles per minute with a substantially sinusoidal velocity pattern, with an average velocity of approximately ten inches per second, attaining a maximum pressure thrust of about 100 lbs. p.s.i.

In FIGURE 2 is depicted a typical stroke-load curve resulting from stroking the shock absorber under the conditions just outlined without any cushioning elastomer body, but fully operatively filled with hydraulic fluid. The horizontal base line B represents the zero load condition during the return interval in a stroke cycle, while the load curve C represents the load conditions attained during compression stroke portion of the stroke cycle. As will be apparent, in approximately the first half of the compression stroke there was a very rapid increase in load, with a markedly rapid load increase at the beginning of the stroke, reflected by the sharp rise in the curve, represented by the reference character P, reaching a peak about midway through the compression stroke and then tapering off to drop on almost a straight line R to the zero terminus of the stroke.

In order to eliminate any false reading due to seal friction in the shock absorber, it was tested empty of hydraulic fluid, with the strip chart recorded results depicted in FIGURE 3. There it will be observed that load resistance is reflected for only a very short initial portion S of the load or pressure stroke, with an immediate flattening of the curve to a short terminal portion of the drop-off side R of the curve.

In comparison with the test results as recorded in the curve patterns of FIGURES 2 and 3, the test results as recorded in the curve pattern depicted in FIGURE 4, wherein the shock absorber was not only filled with hydraulic fluid but also had an approximately 3.5795 gram, about .975 inch diameter multi-closed cell elastomeric damping ball in the compression chamber, graphically show the substantial new and improved operation of the shock absorber. After the initial seal friction resistance S, the load curve assumes asymptotic shape, demonstrating an initial phase, short duration softness or yielding during about the first quarter inch of the stroke as indicated at P'. Then a smoothly progressive but rapid pressure increase is indicated at P'' in the load increasing portion of the stroke. This results from the initial impact yielding and compression of the multi-closed cell elastomeric damping mass 29, merging quickly and after only short stroke progression into a rapidly increasing spring rate stiffening of the ball 29, and orifice damping functioning of the shock absorber to the top of the load portion P of the load curve C. It may also be noted that there is at least a slight lessening of the maximum pressure build-up, showing more rapid damping out, since the curve peak is reached before the maximum load peak in the FIGURE 2 showing of the stroking characteristics of the shock absorber without the auxiliary shock damping multi-bubble elastomer device. Also noteworthy is the fact, indicated by the greater outcurving of the load drop-off portion R of the curve in FIGURE 4, that drop-off is more gradual than the corresponding drop-off in FIGURE 2. There is thus conclusively demonstrated that at the beginning of an abrupt high load compression stroke there is a significant critical damping effect on the initial impact to the shock loads, attained by the presence of the bubble elastomer damping mass 29 in the compression chamber 10 of the shock absorber, with quick, smooth transition to orifice flow damping of lower peak load and thus less strain on the system and mechanism, compared to parallel conditions without the mass 29.

Another important advantage of the bubble elastomer damping mass 29 in the compression chamber resides in that it will also effectively serve as a limit stop to prevent harsh jolts in strike throughs during compression stroke, that is contact of the piston 8 with the foot valve 13 or of the piston rod end connector 25 with the end cap 22. During such extreme movements of the relatively telescopically related parts of the shock absorber, the piston and foot valve compress the damping member 29 therebetween and since the member is only slightly smaller in diameter than the bore diameter of the cylinder, it promptly squeezes into confined relation to the bore wall and then as the elastomeric member becomes confined against further spreading, it bulk compresses with a rapidly increasing spring rate and positively cushions the piston and shock absorber casing to a substantially jar-free stop. Further, by virtue of the multi-closed cell structure of the elastomeric damping member 29 it strongly resists rupturing due to such impact engagement.

Although it is more important to effect damping against shock wave generation in the compression chamber 10, it is also desirable to provide for such damping in the rebound chamber 11, as well as for limit stop damping, similarly as effected with the damping mass 29 in the compression chamber. To this end, a multi-closed cell elastomeric damping mass 31 having closed gas-filled cells 32 is provided in the rebound chamber 11, preferably constructed as a torus or annulus or a ring-shape having an outside diameter dimensioned to permit free sliding of the ring body within the cylinder bore and with clearance between its inside diameter and the piston rod. An axially elongated cross-section is preferred. Similar oil resistant materials and similar relationships of closed cells or bubbles to the elastomer matrix affording similar spring rate characteristics are adapted to be employed in the damping ring mass 31 as in the damping ball mass 29.

During rebound strokes of the piston 8 sharp, high load shocks are damped by the damping mass 31, similarly as described for the damping mass 29. Further, the multi-closed cell elastomeric damping mass 31 serves as a cushioning limit stop between the piston 8 and the bearing closure member 21.

Addition of the free floating multi-closed cell elastomeric damping masses 29 and 31 to the hydraulic shock absorber requires no reconstruction of the damper structure, but merely a placing of the free floating respective masses in the respective chambers in the shock absorber cylinder.

It will be understood that modifications and variations may be effected without departing from the scope of the novel concepts of the present invention.

I claim as my invention:

1. In a direct acting hydraulic shock absorber comprising a tubular cylinder having a bore closed by a foot valve at one end, means defining a reservoir contiguous to the cylinder and with which the cylinder bore communicates through said foot valve, a closure bearing closing the opposite end of the cylinder bore, a piston reciprocably operable in the cylinder bore and having a piston rod extending through said closure bearing, the piston dividing the cylinder bore into a compression chamber between the piston and the foot valve and a rebound chamber between the piston and the closure bearing, both of said chambers being filled with hydraulic fluid and the piston having metering orifice means therethrough for shock damping displacement of hydraulic fluid between said chambers through the orifice means in the reciprocations of the piston within the cylinder, the improvement comprising:

a substantially spherical free floating mass in said compression chamber between said foot valve and said piston and in uninterrupted alignment with said orifice means, said mass being of bulk compressible elastomeric material a substantial part of the volume of which comprises gas-filled, small, unconnected, discrete and independently acting, generally bubble-like cells, said mass being of a diameter only slightly less than the diameter of said cylinder bore, whereby shock waves created by pressure surges of a magnitude greater than can be accommodated by the orifice means will be absorbed by bulk compression of said mass and continued compression movement of the piston is reflected in rapidly increasing spring rate resistance to compression of said mass and damping otherwise proceeding by displacement of hydraulic fluid through said orifice means and said foot valve.

2. A shock absorber as defined in claim 1, in which the piston is adapted to drive said mass in terminal compression stroke against the foot valve whereby the mass is squeezed by the piston into confined relation to the bore wall and then as the mass becomes confined against further spreading it compresses with a rapidly increasing spring rate to positively cushion the piston to a substantially jar-free stop.

3. A direct acting shock absorber as defined in claim 1, in which a compressible elastomeric mass of the same material as said spherical mass is disposed in free floating relation in the rebound chamber for damping shock waves during rebound and also serving as a rebound bumper between the piston and said closure bearing.

References Cited by the Examiner

UNITED STATES PATENTS

| | | | |
|---|---|---|---|
| 2,630,193 | 3/53 | Funkhouser | 188—88 |
| 2,781,869 | 2/57 | Boehm | 267—64 X |
| 2,856,035 | 10/58 | Rohacs | 267—64 X |

FOREIGN PATENTS

| | | |
|---|---|---|
| 1,087,326 | 2/55 | France. |
| 1,187,300 | 9/59 | France. |
| 1,050,130 | 2/59 | Germany. |

EUGENE G. BOTZ, *Primary Examiner.*